UNITED STATES PATENT OFFICE.

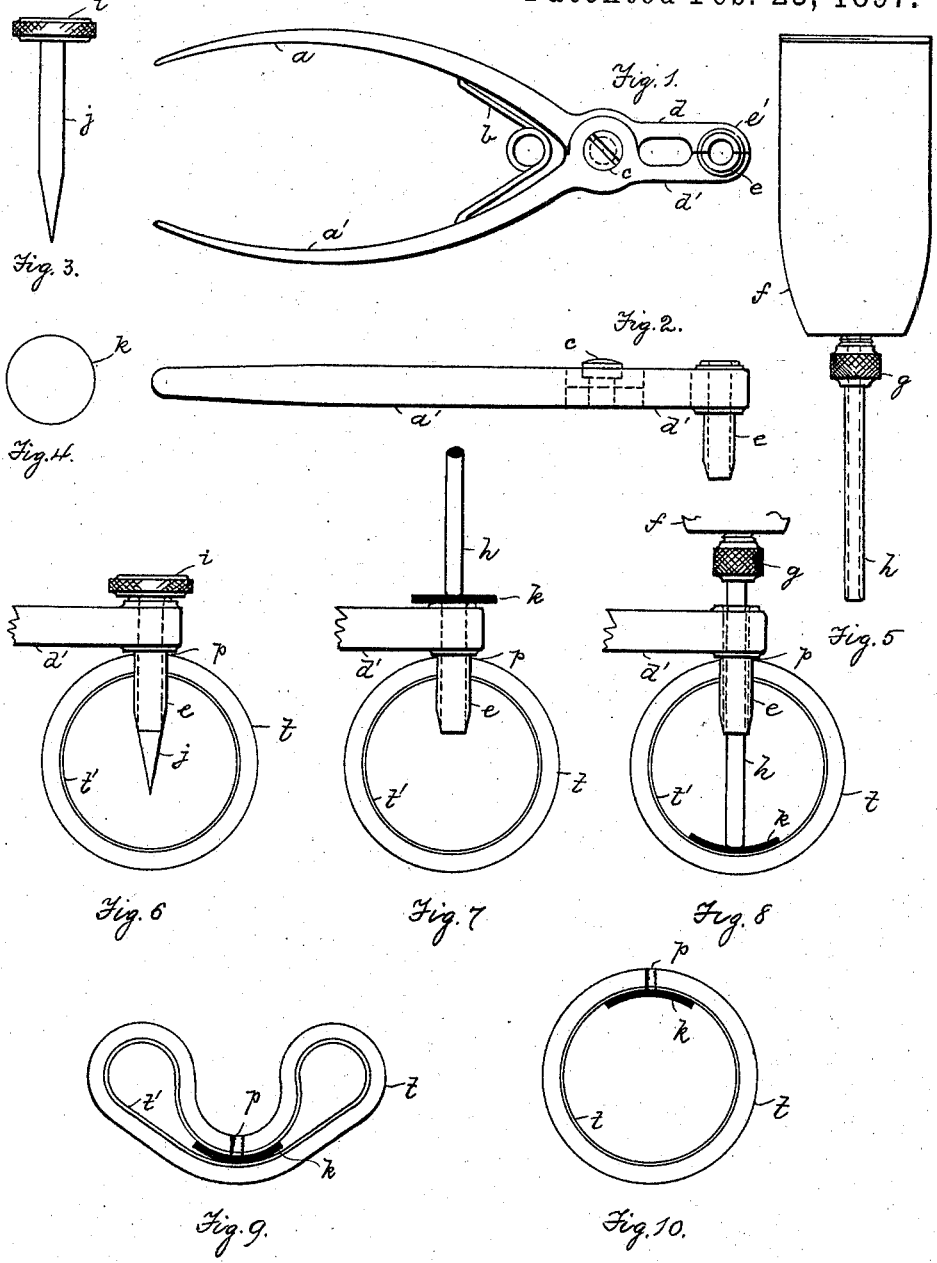

CHARLES E. GREEN, OF CHICAGO, ILLINOIS, ASSIGNOR, BY MESNE ASSIGNMENTS, TO THE NEW YORK BICYCLE EQUIPMENT COMPANY, OF NEW YORK.

METHOD OF PATCHING PNEUMATIC TIRES AND IMPLEMENT THEREFOR.

SPECIFICATION forming part of Letters Patent No. 577,601, dated February 23, 1897.

Application filed October 26, 1895. Serial No. 567,011. (No model.)

*To all whom it may concern:*

Be it known that I, CHARLES E. GREEN, of the city of Chicago, county of Cook, and State of Illinois, have invented certain new and useful Improvements in Methods of and Implements for Repairing and Mending Punctures in Pneumatic Tires, of which the following is a specification.

This invention embraces a method of patching or closing punctures in pneumatic tires or other inflated devices, such as air-cushions and the like, and the necessary means for practicing the same.

The object of the invention is to provide simple and efficient means for repairing pneumatic tires, applicable as well to the double-tube as to the single-tube variety, and which will enable a patch to be applied easily and with little loss of time.

Up to the present time the device most extensively used for this purpose, but which, however, is applicable only to single-tube tires, is a patch in the form of a mushroom. This is applied by first punching a hole (with a special tool) of circular form at the place where the puncture has occurred, and then forcing the disk portion of the mushroom through this hole, leaving the stem projecting through the hole, the projecting portion of the stem being afterward cut off.

The quick repair of tires which have a separate inner or inflation tube has been a serious and difficult problem, and its solution is the more important because a very large majority of the tires manufactured are of this type. In fact, single-tube tires would not be used even to the present limited extent but for their capacity for quick repair. Usually the patching of inner-tube tires is effected by taking the inner tube out of its sheath or envelop and applying the patch to the outside of the tube. This is a tedious operation, and to save the time consumed in performing it the inner tube has been heretofore formed with an interior web extending from side to side, and which is used as a patching-web as occasion may require. The introduction of this web increases the cost of manufacture, it is useless for punctures that may occur at the sides of the tire, it can only be used once at or near the same point, and the operation of applying it is not as expeditious as is desirable. Manifestly, the desideratum is a means of applying a patch directly to the puncture of the inner tube without its removal from the outer tube, and this object is attained by the present invention. In practicing it the first step is to provide a passage or channel by which a patch can be introduced through both tubes, that is to say, into the air-chamber formed by the inner tube. This is accomplished by introducing into the puncture a tube, pipe, or duct of sufficiently rigid material and of any suitable shape, this device being provided with a removable guide in the form of a tapering plug, which makes this insertion possible, since without such guide the thin wall of the inner tire would not furnish sufficient resistance to permit the introduction of the pipe or duct. The guide is now removed and the patch, which must be of very flexible but resisting material, is now laid on the outer end of the pipe or duct with its center in the axis of the latter, and is forced through it by a blunt-pointed instrument, the patch collapsing or folding up like an umbrella. This instrument may be, and preferably is, the nozzle of a cement-can, and the patch being forced entirely through the pipe or duct spreads itself out and is temporarily held against the wall of the inner tire, opposite the puncture, until the cement is spread on the face of the patch. When this is done, the punctured part of the tire is pressed down with the fingers upon the face of the patch, the implements being gradually withdrawn, and the operation is finished.

The invention is believed to present several broadly new features. It is believed to be new to utilize a rigid pipe or duct provided with a removable guide or point, so that it can be introduced into a rupture of a pneumatic tire and furnish a passage or channel through which can be passed a patch not having a stem attached thereto. It is also deemed new to introduce such a patch into a tire, hold it against the wall of the tire opposite the puncture while spreading cement thereon, and then apply and secure it over the puncture. In addition to these new features of the invention (which is also new in other details) the result of introducing a patch into the inside of the inner or inflation tube of a double-tube tire and cementing it in place is believed to be broadly new.

The invention can of course be used for patching single-tube tires, and in this connection it has advantages over the old method. It does not require punching out a hole in the tire or necessarily enlarging the puncture or rupture. It leaves no plug projecting through the tire. It is easier of application, and the simple disk-shaped patch is cheaper to make than the mushroom patch.

It is well understood that it is entirely impracticable to leave a plug in the thin rubber sheet composing the inner tire, as the rubber easily tears. It is also impracticable to attach the inner to the outer tire by means of a plug, as the slight changes of relative position which occur would either pull out the plug or tear the rubber.

The term "pipe or duct" is used in a general sense to denote the character of the insertion device employed to effect the introduction of the patch. For convenience in manipulation this pipe or duct should have a handle, preferably at right angles to the axis thereof, and in the preferred form the insertion implement resembles a pair of pliers or nippers, the pipe or duct being split, one half being at the end of each of the pair of arms. In this form the pipe can be closed to grasp tightly the removable tapering guide-pin and opened slightly to release the latter and permit its withdrawal after the pipe or duct is fully introduced into its place.

The patch or repair-piece is preferably formed of a sheet of canvas having on one or both sides a thin layer of rubber, the rubber surface being that which is applied against and cemented to the inner surface of the tire. If the patch is already coated with cement, the nozzle before referred to will be used to apply a liquid solvent of the cement in lieu of cement itself.

Should the puncture extend through the opposite side of the tire, it is evident that a patch may be applied through the same pipe or duct to each puncture.

By means of the accompanying drawings and the following description my invention will be more fully described.

Figures 1 and 2 show the split-tube pliers or nippers, having handles $a$ and $a'$, spring $b$, screw $c$, and jaws $d$ and $d'$; Fig. 3, the removable point; Fig. 4, the patch or repair-piece; Fig. 5, the reservoir for holding the liquid solvent or cement. Figs. 6, 7, 8, 9, and 10 show the application of applying the patch or repair-piece $k$ within the pneumatic tire $p$.

To apply a patch or repair-piece within a pneumatic tire by means of this device, the removable point $j$, having milled head $i$ for convenience of holding while in the jaws $e$ and $e'$ of the pliers, which are by this means inserted in the puncture in the aforesaid pneumatic tire $t$, Fig. 6. The point $j$ is then withdrawn and a patch or repair-piece $k$ placed into position, as shown in Fig. 7, upon the upper opening of the split tube. The patch or repair-piece $k$ is then forced into the tube $e$ by the nozzle $h$ of the reservoir $f$. The pliers or nippers are then pressed downward until the end of the nozzle of the split tube $e$ touches the bottom of the inner portion of the pneumatic tire $t'$, Fig. 7. The pliers and nippers, together with the reservoir and its nozzle, are pressed downward to the bottom of the pneumatic tire with the patch or repair piece inclosed within the jaws of the split-tube pliers or nippers. The split-tube pliers are then raised while the nozzle of the reservoir is pressed firmly against the inner and bottom of the pneumatic tire. The patch or repair-piece $k$, being thus freed or released from the jaws $e$ and $e'$, assumes the position shown in Fig. 8. The liquid solvent or cement is then applied to the patch or repair-piece $k$ from the reservoir $f$ through its nozzle $h$. The device is then withdrawn and the pneumatic tire, being elastic, is pressed together in the form shown in Fig. 9. The patch or repair-piece then firmly adheres to the inner and upper surface of the pneumatic tire. The pneumatic tire is then reinflated and ready for use.

The patch or repair-piece may have a soluble and adhesive compound on its surface and the reservoir may be filled with a liquid solvent, or the patch or repair-piece may be without any coating or other preparation and the reservoir filled with cement.

This device may be applied to any form of pneumatic tire for the purpose above described.

What I claim as new, and desire to secure by Letters Patent, is—

1. The described method of patching or closing a puncture in a pneumatic tire, said method consisting in introducing into the puncture a rigid pipe or duct until its inner end extends into the air-chamber of the tire, forcing through the pipe or duct a flexible patch by a blunt implement, as specified, holding the patch against the wall of the air-chamber opposite the puncture while spreading cement or solvent thereon, and then pressing the walls of the tire together, withdrawing the implement and causing the patch to adhere to the punctured surface, substantially as described.

2. The specified means for repairing punctures in pneumatic tires, said means comprising in combination a pipe or duct in two parts, each part attached to a handle and the two handles being hinged together, whereby on insertion of the pipe or duct in a puncture the latter can be distended, and a tapering guide-pin, inclosed in and having its point projecting beyond the inner end of said pipe or duct during the insertion thereof, and adapted to be withdrawn leaving the latter within the air-chamber of the tire, substantially as described.

CHARLES E. GREEN.

Witnesses:
 LEONARD E. BROOKES,
 K. M. MAYER.